United States Patent

Cook

[11] Patent Number: 6,076,572
[45] Date of Patent: Jun. 20, 2000

[54] APPARATUS FOR EXCAVATING AND CRUSHING TREE STUMPS

[76] Inventor: Douglas B. Cook, 23 Thornton St., Mendon, Mass. 01756

[21] Appl. No.: 09/251,601

[22] Filed: Feb. 16, 1999

[51] Int. Cl.[7] .................................................. A01G 23/06
[52] U.S. Cl. .................................. 144/24.12; 241/101.73
[58] Field of Search ............................... 144/24.12, 334; 37/301, 302; 30/134; 294/106; 241/101.73

[56] References Cited

U.S. PATENT DOCUMENTS

| | | | |
|---|---|---|---|
| 4,214,617 | 7/1980 | McKenry | 144/24.12 |
| 4,481,989 | 11/1984 | Peters | 144/335 |
| 5,005,622 | 4/1991 | Beach et al. | 144/241 |
| 5,054,703 | 10/1991 | Morey | 241/296 |
| 5,080,151 | 1/1992 | Pallari | 144/24.12 |
| 5,146,683 | 9/1992 | Morikawa et al. | 30/134 |
| 5,360,041 | 11/1994 | Stevens | 144/24.12 |
| 5,419,380 | 5/1995 | Bot | 144/334 |
| 5,497,815 | 3/1996 | Bowling | 144/241 |
| 5,499,771 | 3/1996 | Esposito et al. | 241/101.74 |
| 5,533,682 | 7/1996 | de Gier et al. | 241/101.73 |
| 5,613,537 | 3/1997 | Gassiott | 144/24.12 |
| 5,623,978 | 4/1997 | Clemenson | 144/235 |
| 5,623,979 | 4/1997 | Bowling | 144/241 |
| 5,671,892 | 9/1997 | Morikawa et al. | 241/101.73 |
| 5,743,314 | 4/1998 | Puch | 144/24.12 |

*Primary Examiner*—Joseph J. Hail, III
*Assistant Examiner*—Dermott J. Cooke
*Attorney, Agent, or Firm*—Peter F. Corless; Christine C. O'Day; Dike, Bronstein, Roberts & Cushman, LLP

[57] ABSTRACT

The present invention provides an apparatus that lifts, secures, splits and/or crushes tree stumps or other materials, particularly wooden or metal materials and other materials that may be present at an excavation site. The apparatus is characterized in part by a two pivot point design. A first pivot point allows for the pivotable operation of an engaging unit which grabs and lifts the tree stump. The engaging unit further acts a durable and secure support member for the tree stump during the splitting and crushing process. The second pivot point allows for the pivotable operation of a cutting device which facilitates splitting and crushing of the stumps.

2 Claims, 5 Drawing Sheets

APPARATUS FOR EXCAVATING AND CRUSHING TREE STUMPS

BACKGROUND OF THE INVENTION

1. Field of the Invention

The present invention relates to an apparatus for lifting, excavating, splitting and/or crushing tree stumps, or other materials, such as wooden or metal materials that may be present at an excavation site. The apparatus is characterized in part by a two pivot point design.

2. Background

A number of mechanical devices have been developed for the crushing and demolition of a variety of materials, including wood. Certain of these devices utilize a frame having an upper and lower jaw for gripping and cutting the material or work product.

For example, U.S. Pat. No. 5,533,682 describes a device for crushing and/or cutting concrete, cutting iron sections and/or scrap iron, and cutting and splitting wood. The device comprises a frame having a first jaw that is stationary with respect to the frame, and a second jaw that is pivotable by means of a setting cylinder. While the fixed first jaw is intended to support the material being cut, the pivotable jaw includes a pointed crusher tooth and knife-like section that facilitate the cutting of the material.

This device offered some advantages over the art. For example, the jaws of the device were detachably connected to the frame, so that a different set of jaws could be used for different materials being cut. Thus, one device could be used for multiple purposes, as long as one purchased the appropriate sets of jaws.

However, this type of device presented certain limitations as a wood splitter and crusher. The particular embodiment described as being suited for cutting and splitting wood employed two serrated strips located on the inner surface of the fixed jaw to prevent slippage of the wood during the cutting process. While this design may be effective for cutting smaller sections of wood, logs, root ends and the like, when cutting larger sections of wood, e.g., tree stumps, forward slippage of the wood becomes highly problematic. Further, the force of the pivotable jaw upon the stationary jaw could lead to dislodgement or misalignment of one or more of the jaws with respect to the frame.

A similar device intended for use in the demolition of iron or steel reinforced concrete structures is disclosed in U.S. Pat. No. 5,146,683. This device, termed a reinforcement cutter, also employs a moveable upper jaw and a stationary lower jaw configuration. The device further includes a first and second shearing cutter means that are dismountably secured to each of the opposed inner lateral surfaces of the upper and lower jaws in a bent formation. As in the case above, however, the potential for forward slippage of the wood and/or dislodgement of one or more of the jaws is problematic when using this device for cutting and splitting large sections of wood.

Other devices for splitting and crushing tree stumps have been developed that utilize a bit/counter bit configuration.

Swedish patent publication 378,502 describes a splitting bit that is pressed between two counter bits. The counter bits are disposed at the adjacent upper edges of arm-like structures that support the tree stump, and have an arcuate shape that facilitates the holding of the stump.

However, this configuration has several disadvantages. For example, the area or slit between the counter bits tends to get clogged with debris from the splitting and crushing procedure, particularly at the base section of the slit. This clogging requires that the apparatus be shut down and the slit cleared from time to time during the splitting and crushing procedure. It is also possible that rocks coming up with stump roots may penetrate or lodge in the slit between the counter bits thereby causing damage to the counter bits. Additionally, the arcuate design of the bits can be problematic when replacing dulled bits. Further, unless the pivotable bit is manufactured such that it aligns precisely with the slit between the counter bits, damage to the apparatus is very possible.

U.S. Pat. No. 5,080,151 to Pallari describes a tree stump lifting and crushing apparatus comprising one or more lifting hooks and a bit which is pivotable and turnable against a counter bit for crushing tree stumps placed therebetween. The pivotably closable bit and counter bit include a cutting surface and a counter surface. The counter surface is substantially continuous and extends across the width of the cutting surface upon closing of the bits. A closure stop means is provided that is intended to prevent destructive engagement of the cutter surface and counter surface.

Though somewhat of an improvement over the prior art, serious problems were encountered by this apparatus. For example, effectively securing the tree stump during the lifting and crushing procedure remained problematic. Additionally, the area or slit existing between the stump hooks invited the same debris and clogging as the devices of the prior art. Consequently, similar limitations were observed in terms of downtime and potential for damage to the apparatus.

There remains a need for an apparatus to securely lift, excavate, split and crush tree stumps that avoids the various problems of the prior art. Specifically, it would be highly desirable to develop a tree stump lifting and crushing apparatus that would offer an increased holding area for the grabbing and subsequent handling of the tree stump during the cutting process. It also would be highly desirable to develop a tree stump lifting and crushing device that could securely hold the tree stump during the cutting process such that forward slippage of the stump would be prevented. It also would be highly desirable to develop a tree stump lifting and crushing device that would avoid the inherent limitations associated with the devices of the prior art that have a stationary jaw configuration. Further, it would be highly desirable to develop a tree stump lifting and crushing device that would avoid the debris and clogging problems seen in the devices of the prior art.

SUMMARY OF THE INVENTION

The present invention provides an apparatus that can lift, excavate, secure, split and/or crush tree stumps, as well as other materials, particularly other wooden or metal materials that may be present at a work site. The apparatus is characterized in part by a two pivot point design. In a preferred design, a first pivot point assembly allows for the pivotable operation of an engaging unit which can grab and lift the tree stump. A second pivot point assembly allows for the pivotable operation of a cutting device which facilitates splitting and crushing of the stump.

The novel design of the present invention provides significant advantages over the devices of the prior art utilizing a single pivot point system. For example, the mutiple pivot design of the present invention permits a significantly increased holding area for the tree stump or other object during the excavating and crushing process. Additionally, this increased holding area provides better mechanical advantages in general, as the engaging unit and cutting device can be retracted to open wider to accommodate larger tree stumps. This larger, wider opening is particularly useful when grabbing the tree stump at the outset of the excavation process.

In preferred designs, the engaging unit and cutting or grappling devices re independently, pivotably and opposedly connected to a lower end of an arm-like supporting structure. An upper end of the supporting structure is attached to a hydraulically powered, manipulatable boom such as a bucket arm of a digging machine, crane or the like.

The supporting structure suitably comprises two reinforcing side plates, sometimes referred to herein as "sticks", with a stick backplate disposed therebetween. The supporting structure has a wider diameter at its lower end. This design provides additional reinforcement to the supporting structure during the splitting and crushing process and avoids destructive engagement of the engaging unit and cutting device.

In a preferred embodiment, a plurality of anchor hooks protrude from each of the outer surfaces of the reinforcing side plates of the supporting structure. The anchor hooks provide a means of securing a first and second reinforcing member on either side of the two reinforcing side plates. Typically, one end of the reinforcing member is mounted to the anchor hooks; the other end is secured below, at the pivot point assemblies. This novel aspect of the present invention provides additional support, strength and durability to the apparatus during the tree lifting and crushing operation. Further, this design provides significant ease of operation in terms of mounting and dismounting attachments relative to an excavator.

The engaging unit preferably comprises two side plates and a backplate securely disposed therebetween. In a preferred embodiment, each side plate has a spear-like extension which protrudes from a leading edge of the side plate to facilitate grasping and/or securing of the tree stump during the lifting and crushing process. The planar design of the engaging unit's backplate does not invite any clogging or debris from the stumps being cut. Therefore, opportunity for damage to the apparatus associated with clogging or debris and downtime associated therewith are substantially eliminated.

The cutting device preferably has a curved, sharpened outer surface referred to herein as a knife blade. In a preferred embodiment, a similarly curved, elongated knife tooth is mountably attached to the knife blade. A knife tooth plate is disposed between the two sides of the knife tooth and provides reinforcement and strength to the cutting device structure during operation. The knife tooth and knife tooth plate may be removed, sharpened and replaced as necessary. In an alternate aspect of the invention, a grappling unit is used in place of a cutting unit. In a particularly preferred aspect, a grappling unit may be removably attached to the cutting unit whereby a single apparatus can be readily outfitted for splitting/crushing objects (with use of the cutting unit) as well as lifting and transporting objects (with use of the removable grappling unit).

On one side of the supporting structure, a first hydraulic cylinder connects the reinforcing member to a rear portion of the engaging unit. On the other side of the arm-like supporting structure, a second hydraulic cylinder connects the reinforcing member to a rear portion of the cutting device. Using hydraulics controlled from the cab of the digging machine, the two hydraulic cylinders are retracted to facilitate movement and communication of the engaging unit and cutting device during the tree lifting and crushing process.

DETAILED DESCRIPTION OF THE INVENTION

As indicated above, the present invention provides a multiple-pivot apparatus that can lift, excavate, secure, split and/or crush tree stumps, as well as other materials, particularly other wooden materials that may be present at a work site such as an excavation site for constructing or expanding a building, road and the like.

Figure 1:
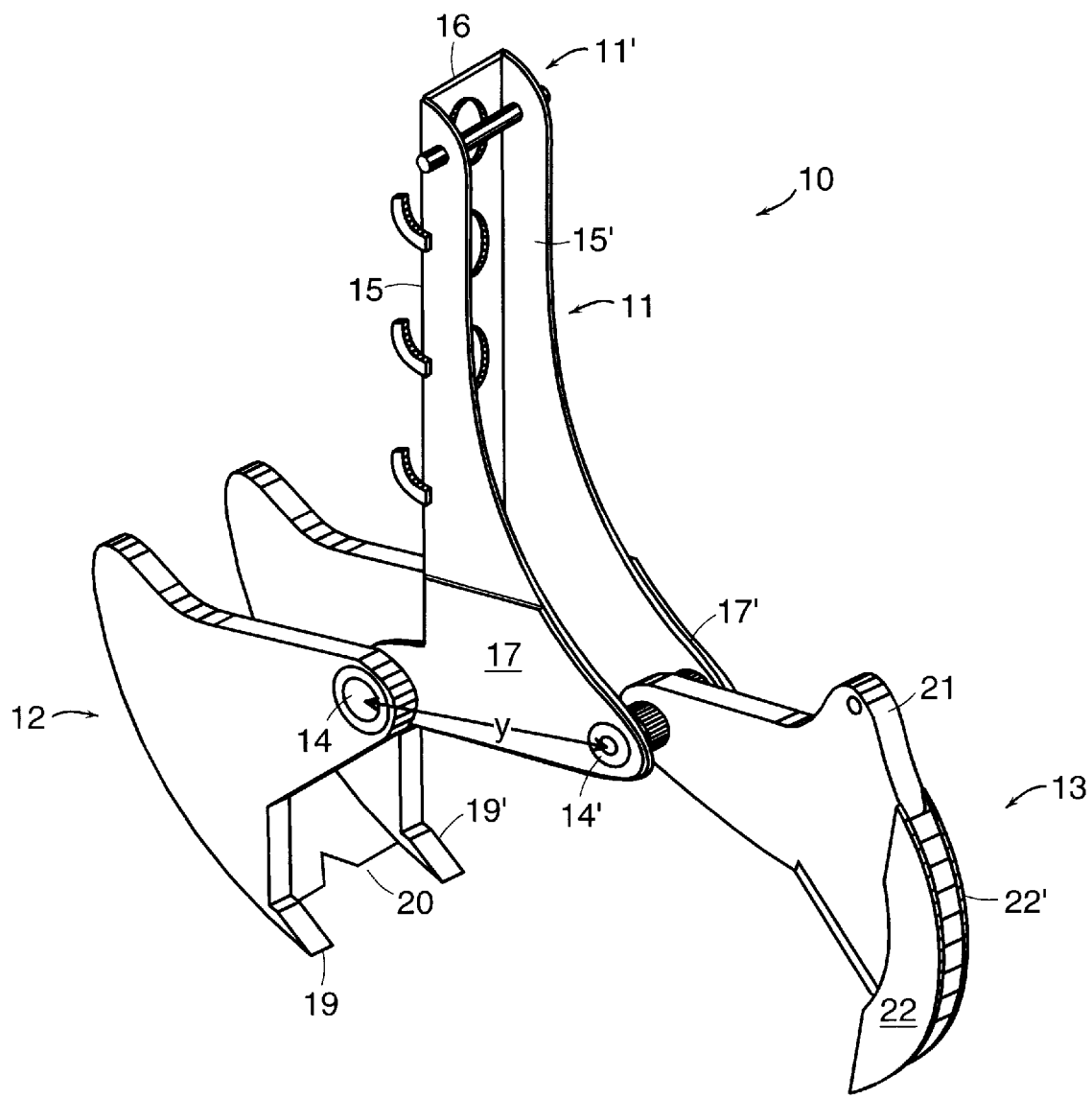
FIG. 1 is a perspective view of the tree stump lifting and crushing apparatus of the present invention.
Figure 5:
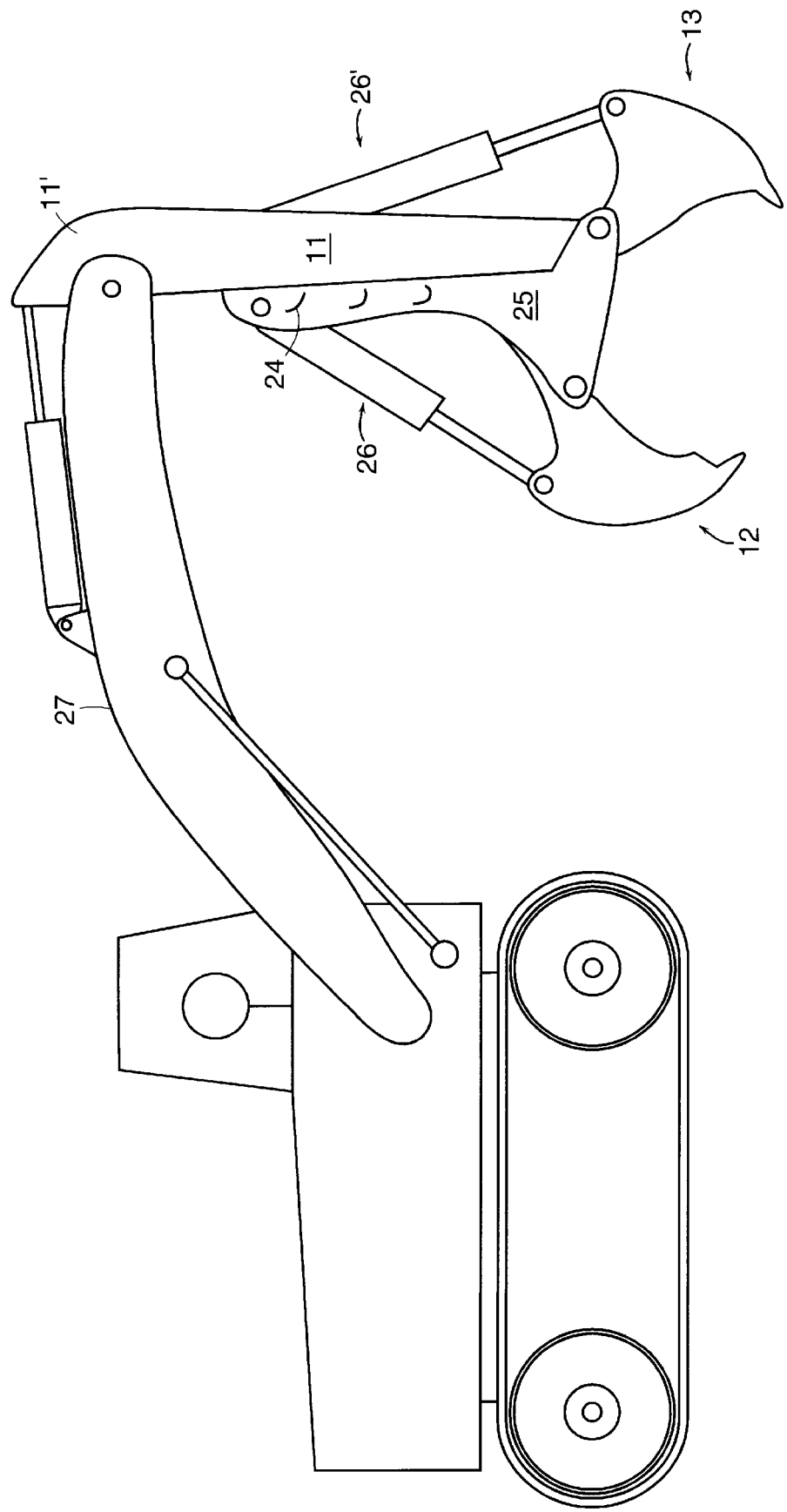
FIG. 5 is a side view of a preferred embodiment of the present invention.

Referring now to FIGS. 1 and 5, a preferred apparatus 10 of the present invention is shown. The apparatus generally comprises three main components, an arm-like supporting structure 11, an engaging unit 12, and a cutting device 13. In a preferred embodiment, these components are made of mild and high carbon steel, e.g., T1, or other suitable metal material. Such materials are commercially available from a variety of steel suppliers.

The supporting structure 11 has a curved L-shape and is movably attached at its upper end 11' to a suitable power source, e.g., a hydraulically powered, manipulatable boom such as a bucket arm of a digging machine 27 (as shown in FIG. 5).

Figure 4:
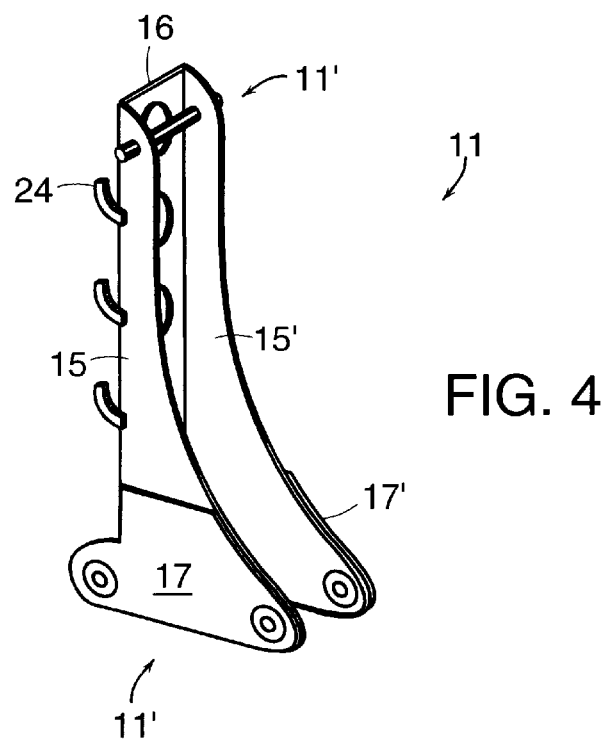
FIG. 4 is a sectional view of the arm-like supporting structure shown in FIG. 1.

As shown in FIG. 4, the supporting structure 11 comprises two reinforcing side plates or sticks 15 and 15', with a stick backplate 16 disposed therebetween. In a preferred embodiment of the present invention, sticks 15 and 15' have a wider diameter at their lower end, to which a similarly shaped reinforcing plate, referred to as supporting plate 17 and 17' is welded or otherwise mountably attached. This design provides additional reinforcement to the supporting structure during the cutting process and avoids destructive engagement of the engaging and cutting device.

The thickness of the sticks 15 and 15' is preferably about ¼ to 1½ inches, more preferably about ½ to 1 inch, most preferably about ¾ inch. The thickness of the supporting structure backplate 16 is preferably about ¼ to 1½ inches, more preferably about ½ to 1 inch, most preferably about ¾ inch.

As shown in FIG. 1, the engaging unit 12 and cutting device 13 are each pivotably and opposedly connected to the lower portion 11" of the supporting structure 11 by means of two pivot pin assemblies 14 and 14', respectively.

The multiple pivots of an apparatus of the invention may be suitably spaced apart by a relatively wide range of dimensions. Preferred distances to space the multiple pivots may depend in part on the targeted use of the particular apparatus. More specifically, referring to FIG. 1, pivots 14 and 14' may be suitably spaced (i.e. distance y in FIG. 1) at least about 10 to 24 inches, more typically from about 10 inches to 6 to 8 feet, more typically distance y being from about 1 foot to about 6 feet. A distance y between pivots 14 and 14' of about 3 feet may be particularly preferred.

Figure 2A:
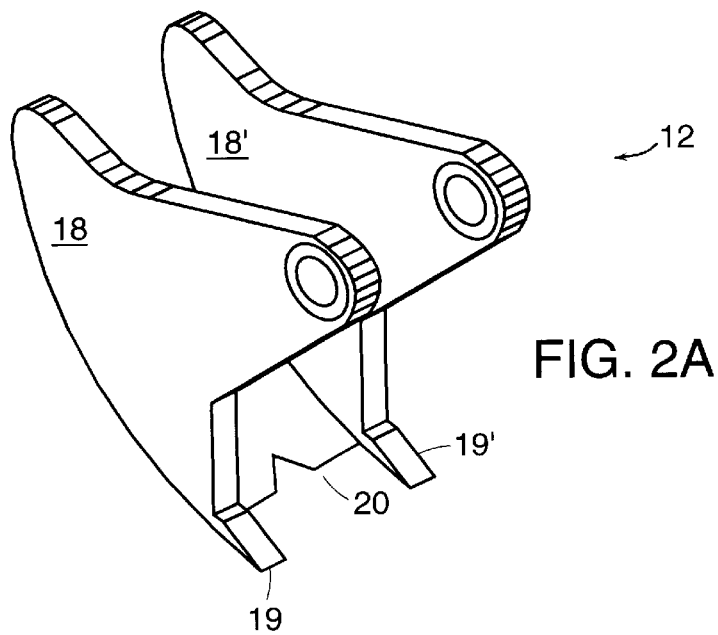
FIGS. 2A–2C are sectional views of the engaging unit shown in FIG. 1.
Figure 2B:
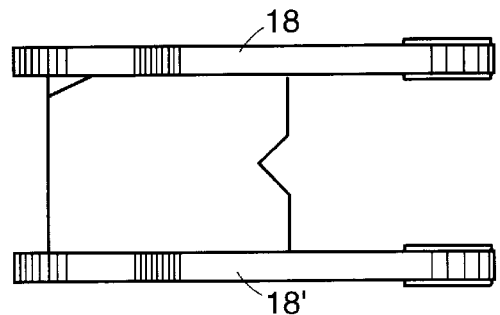
Figure 2C:
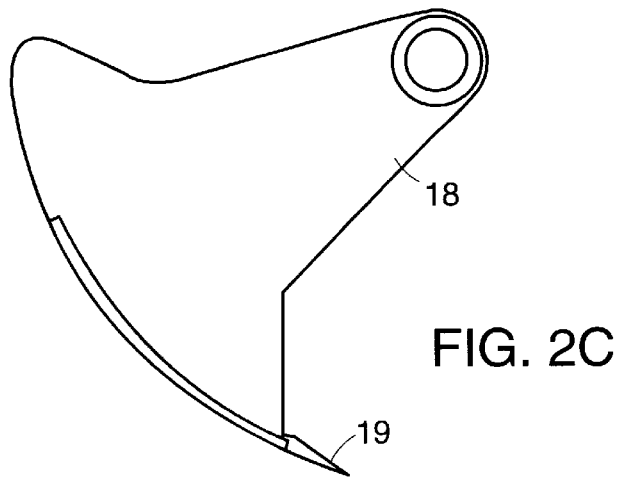

Referring to FIG. 2, the engaging unit 12 comprises two side plates 18 and 18', with each side plate having a spear-like extension, 19 and 19' respectively, extending from its leading edge, and a backplate 20 securely disposed therebetween. In a preferred embodiment, extensions 19 and 19' comprise replaceable teeth with a cap pinned to a shank unit which are welded to side plates 18 and 18'. The backplate 20 provides significant support and reinforcement to the engaging unit 12 during the lifting, excavating, splitting and crushing process. The planar design of the backplate 20 does not invite any clogging or debris from the stumps being crushed. Therefore, opportunity for damage to the apparatus associated with clogging or debris and the downtime associated therewith are substantially eliminated.

The thickness of side plates 18 and 18' of the engaging unit 12 is preferably about 1 to 2 inches, more preferably about 1½ inches. The thickness of the engaging unit's backplate 20 is preferably about 1 to 2 inches, more preferably about 1½ inches.

Figure 3:
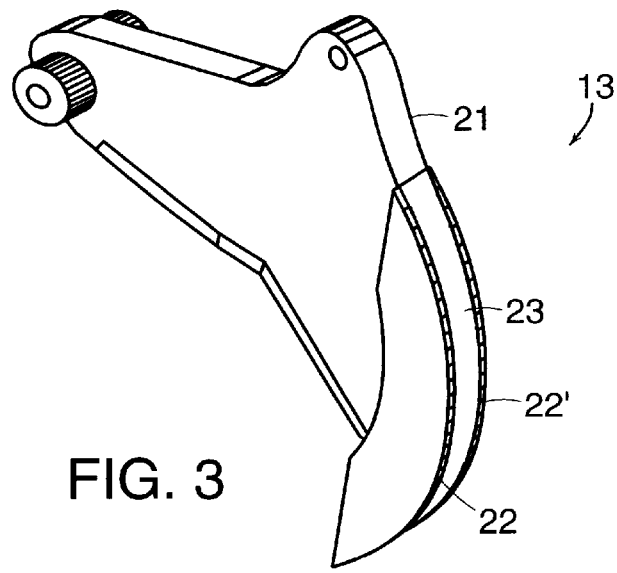
FIG. 3 is a sectional view of the cutting device shown in FIG. 1.

Referring to FIG. 3, the cutting device generally comprises a curved, sharpened outer surface, termed a knife blade 21. In a preferred embodiment, a similarly curved, elongated knife tooth 22 is mountably attached to the knife blade. The knife tooth provides a penetration point for initiating the splitting process. Preferably, the two sides of the knife tooth 22 and 22' extend across about the lower ⅔ section of the knife blade 21. The knife tooth is preferably made from AR 400 steel (an abrasive resistant form of T-1).

A knife tooth plate 23 is disposed between the two sides of the knife tooth and provides reinforcement and strength to the cutting device structure during the tree stump splitting and crushing process. The knife tooth plate 23 also increases the wear-resistance and longevity of the device. The knife tooth and knife tooth plate may be removed, sharpened and replaced as necessary.

Figure 6:
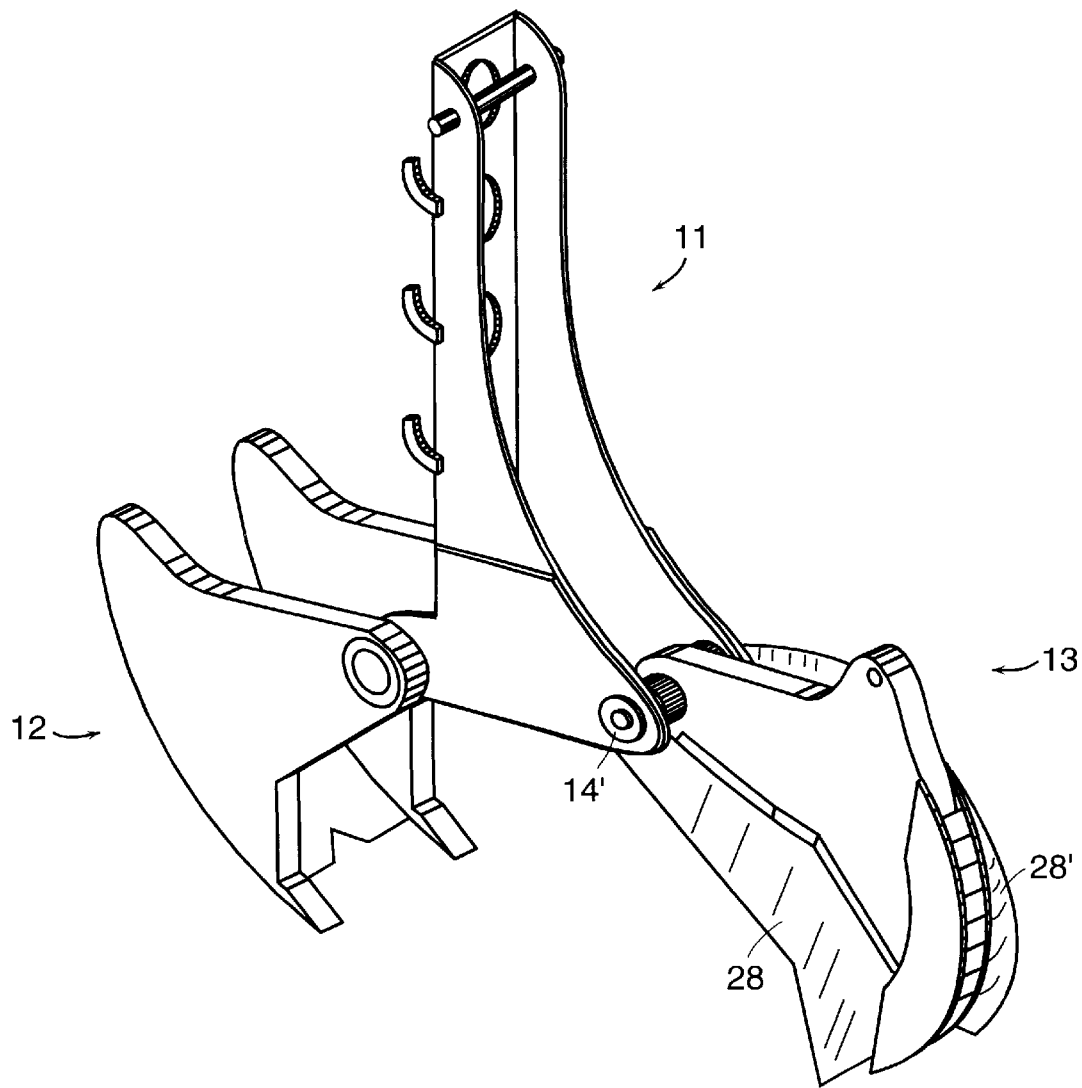
FIG. 6 is a perspective view of an embodiment of the present invention which utilizes a grappling unit.

In an alternate embodiment of the present invention, the apparatus 10 comprises a grappling unit 28. Referring to FIG. 6, grappling units 28 and 28' extend from either side of pin assembly 14' and connect to the respective sides of knife tooth 22 and 22'. The grappling unit may be used in addition to the cutting device components described above, or it may be manufactured as a stand-alone unit. As should be understood from FIG. 6, with grappling unit 28, apparatus 10 can be employed to haul or otherwise transport any of a variety of materials, including tree stumps or other loads that may be present at an excavation site. Additionally, by employing the multiple spaced pivots for engaging and grappling units, greater volumes of materials can be lifted and transported with an apparatus of the invention, relative to prior grappling systems.

As in the case of the knife tooth, the other components of the cutting device are preferably made from AR 400 steel (an abrasive resistant form of T-1).

The thickness of the sides of the knife tooth 22 and 22' and the knife tooth plate 23 are preferably ¼ to 1 inch, more preferably about ½ inch. The thickness of the knife blade 21 is preferably about 2 to 4 inches, more preferably about 2½ inches.

Referring to FIGS. 1, 4 and 5, a plurality of anchor hooks 24 protrude from each of the outer surfaces of the sticks 15 and 15'. The anchor hooks 24 provide a means of securing a first and second reinforcing member 25 and 25' (shown in FIG. 5) on either side of the sticks 15 and 15'. Typically, one end of the reinforcing member 25 is mounted to one or more of the anchor hooks 24; the other end is secured below at the pivot point assemblies 14 and 14'. This novel aspect of the present invention provides additional support and durability to the apparatus during the tree lifting and crushing operation. Further, this design provides significant ease of operation in terms of mounting and dismounting attachments relative to an excavator.

Referring with particularity to FIG. 5, movement and communication of the engaging unit 12 and cutting device 13 are facilitated by auxiliary hydraulic circuits, designated herein as hydraulic cylinders 26 and 26'. On one side of the supporting structure, a first hydraulic cylinder 26 is attached at one end to an aperture 28 on reinforcing member 25. The other end of the hydraulic cylinder is attached to a rear portion of engaging unit 12. On the other side of the supporting structure, a second hydraulic cylinder 26' connects reinforcing member 25' to a rear portion of cutting device 13. In a preferred embodiment, case hardened steel pins are used to facilitate these attachments.

The two hydraulic cylinders 26 and 26' can be manually retracted and extended using hydraulics controlled from the cab of the digging machine. This operation facilitates movement and communication of the engaging unit 12 and cutting device 13 during the tree stump lifting and crushing process.

Referring again to FIG. 5, the tree stump lifting and crushing operation can be illustrated as follows. Using hydraulics controlled from the cab of the digging machine, the operator of the digging machine can move the bucket arm 27 to deploy the arm-like supporting structure 11 to the desired location in proximity of the targeted tree stump. The engaging unit 12 and cutting device 13 are then drawn back and apart utilizing their respective hydraulic cylinders 26 and 26' and pivot point assemblies 14 and 14'. The tree stump then can be grasped, lifted and positioned securely against engaging unit 12.

While the stump is securely held by engaging unit 12, splitting and crushing of the stump is effected by retracting and releasing the cutting device 13 utilizing hydraulic cylinder 26' and the hydraulic controls associated therewith. Depending upon the length and size of the stump, this movement can be repeated as necessary to effect the desired degree of crushing of the stump.

The terms and expressions which have been employed herein are used as terms of description and not of limitation. There is no intent, in the use of such terms and expressions, of excluding any of the equivalents of the features shown and described or portions thereof, but it is recognized that various modifications are possible within the scope of the invention claimed.

What is claimed is:

1. An apparatus adapted for lifting, splitting and/or crushing tree stumps comprising an engaging unit positioned on a first pivot position and a cutting or grappling unit positioned on a second pivot position, the first and second pivot positions spaced from each other;

wherein the apparatus comprises an arm-like supporting structure to which the engaging unit and cutting or grappling unit are attached, the supporting structure comprising a first and second reinforcing side plate and a backplate disposed therebetween; and wherein a plurality of anchor hooks protrude from each of the outer surfaces of the first and second reinforcing side plates.

2. The apparatus of claim 1, wherein the first and second reinforcing side plates are attached to the anchor hooks, the first and second reinforcing side plates extend lengthwise along the respective sides of the reinforcing side plates and connect to the first and second pivots.

* * * * *